(12) United States Patent  (10) Patent No.: US 8,379,144 B2
Nam  (45) Date of Patent: Feb. 19, 2013

(54) BATTERY COVER STRUCTURE INCLUDING AN ANTENNA UNIT AND PHOTOGRAPHING APPARATUS INCLUDING THE SAME

(75) Inventor: Uk Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 12/727,407

(22) Filed: Mar. 19, 2010

(65) Prior Publication Data

US 2010/0245659 A1 Sep. 30, 2010

(30) Foreign Application Priority Data

Mar. 24, 2009 (KR) ........................ 10-2009-0024999

(51) Int. Cl.
*H04N 5/225* (2006.01)
*H04M 1/00* (2006.01)
(52) U.S. Cl. ...................... 348/375; 348/376; 455/575.7
(58) Field of Classification Search ........... 348/374–375
See application file for complete search history.

(56) References Cited

U.S. PATENT DOCUMENTS

| | | | | |
|---|---|---|---|---|
| 6,028,555 | A * | 2/2000 | Harano | 343/702 |
| 6,181,283 | B1 * | 1/2001 | Johnson et al. | 343/702 |
| 7,542,789 | B2 * | 6/2009 | Liu et al. | 455/575.8 |
| 8,024,015 | B2 * | 9/2011 | Araki et al. | 455/575.1 |
| 8,188,930 | B2 * | 5/2012 | Sung et al. | 343/702 |
| 2008/0194302 | A1 * | 8/2008 | Castaneda et al. | 455/575.3 |
| 2009/0312069 | A1 * | 12/2009 | Peng et al. | 455/572 |
| 2010/0016024 | A1 * | 1/2010 | Yang et al. | 455/566 |
| 2010/0137042 | A1 * | 6/2010 | Na et al. | 455/575.5 |
| 2010/0184493 | A1 * | 7/2010 | Lin et al. | 455/575.7 |

* cited by examiner

*Primary Examiner* — Ngoc-Yen Vu
(74) *Attorney, Agent, or Firm* — Drinker Biddle & Reath LLP

(57) ABSTRACT

Provided are a battery cover structure and a photographing apparatus including the same. The battery cover structure includes a frame in which an antenna connection unit is disposed, and a battery cover installed on the frame, wherein the battery cover includes an installing unit installed on the frame, a first cover unit installed on the installing unit, and an antenna unit installed on the first cover unit, wherein electrical contact between the antenna unit and the antenna connection unit is maintained or released according to a location of the first cover unit.

20 Claims, 9 Drawing Sheets

BATTERY COVER STRUCTURE INCLUDING AN ANTENNA UNIT AND PHOTOGRAPHING APPARATUS INCLUDING THE SAME

CROSS-REFERENCE TO RELATED PATENT APPLICATION

This application claims the benefit of Korean Patent Application No. 10-2009-0024999, filed on Mar. 24, 2009, in the Korean Intellectual Property Office, the entire disclosure of which is incorporated herein by reference.

BACKGROUND OF THE INVENTION

1. Field of the Invention

The invention relates to a battery cover structure, and more particularly, to a battery cover structure including an antenna unit.

2. Description of the Related Art

Recently, wireless communication technologies, such as wireless networking technologies (e.g., Wi-Fi), have become widely available. In order for a device to use these wireless networking technologies an antenna must be included in the device.

Consumers want to use these wireless networking technologies with portable electronic devices such as cameras. However, consumers also want the portable electronic devices to be easy to carry and small.

SUMMARY OF THE INVENTION

An embodiment of the invention provides a battery cover structure including an antenna unit, and a photographing apparatus including the battery cover structure.

According to an embodiment, there is provided a battery cover structure including a frame in which an antenna connection unit is disposed; and a battery cover installed on the frame, wherein the battery cover may include an installing unit installed on the frame; a first cover unit installed on the installing unit; and an antenna unit installed on the first cover unit, wherein electrical contact between the antenna unit and the antenna connection unit is maintained or released according to a location of the first cover unit.

The antenna connection unit may be installed in the frame so as to be elastically biased against a direction in which the antenna connection unit contacts the antenna unit.

The battery cover structure may further include a battery accommodating unit installed in the frame, wherein a battery is accommodated in the battery accommodating unit, and the battery cover may be disposed on an inlet of the battery accommodating unit.

The installing unit may be installed so as to rotate around the frame.

The installing unit may be installed to the frame so as to constitute a hinge structure.

The battery cover structure may further include a hinge hole formed in the installing unit, wherein a hinge pin installed in the frame is inserted into the hinge hole.

The battery cover structure may further include a torsion coil spring fitted to the hinge pin.

The first cover unit may be installed so as to slide on the installing unit.

The battery cover structure may further include a guide portion formed on the installing unit; and a guide accommodating portion in which the guide unit is accommodated, wherein the guide accommodating portion is formed on the first cover unit.

The battery cover structure may further include a fixing protrusion formed on an end of the first cover unit, and a fixing groove corresponding to the fixing protrusion, wherein the fixing groove is formed in the frame.

The antenna unit may include at least one terminal contact portion performing electrical connection with the antenna connection unit.

The at least one terminal contact portion may move towards the antenna connection unit so as to come in contact with the antenna connection unit when the battery cover is closed.

The battery cover structure may further include a second cover unit covering the antenna unit.

According to another embodiment, there is provided a photographing apparatus photographing a subject, the photographing apparatus including an antenna connection unit disposed in the photographing apparatus; a frame in which the antenna connection unit is disposed; and a battery cover installed on the frame, wherein the battery cover may include an installing unit installed on the frame; a first cover unit installed on the installing unit; and an antenna unit installed on the first cover unit, wherein electrical contact between the antenna unit and the antenna connection unit is maintained or released according to a location of the first cover unit.

The antenna connection unit may be installed in the frame so as to be elastically biased against a direction in which the antenna connection unit contacts the antenna unit.

The photographing apparatus may further include a battery accommodating unit installed in the frame, wherein a battery is accommodated in the battery accommodating unit, and the battery cover may be disposed on an inlet of the battery accommodating unit.

The installing unit may be installed so as to rotate around the frame.

The first cover unit may be installed so as to slide on the installing unit.

The photographing apparatus may further include a guide portion formed on the installing unit; and a guide accommodating portion in which the guide portion is accommodated, wherein the guide accommodating portion is formed on the first cover unit.

The antenna unit may include at least one terminal contact portion performing electrical connection with respect to the antenna connection unit.

The at least one terminal contact portion may move towards the antenna connection portion so as to come in contact with the antenna connection unit when the battery cover is closed.

The photographing apparatus may further include a second cover unit covering the antenna unit.

In an embodiment, a battery cover is provided. The battery cover including an installing unit for installing on a frame of a portable electronic device; a first cover unit for installing on the installing unit; and an antenna unit disposed on the first cover unit, wherein when the battery cover is installed on the portable electronic device, electrical contact between the antenna unit and the portable electronic device is maintained or released according to a location of the first cover unit.

BRIEF DESCRIPTION OF THE DRAWINGS

The above and other features and advantages will become more apparent by describing in detail exemplary embodiments of the invention with reference to the attached drawings in which.

DETAILED DESCRIPTION OF THE INVENTION

Thus there is a need in the art for a battery cover structure including a frame in which an antenna connection unit is disposed; and a battery cover installed on the frame. The battery cover including an installing unit installed on the frame; a first cover unit installed on the installing unit; and an antenna unit installed on the first cover unit, wherein electrical contact between the antenna unit and the antenna connection unit is maintained or released according to a location of the first cover unit.

Hereinafter, exemplary embodiments of the invention will be described in detail with reference to the attached drawings.

Figure 1:
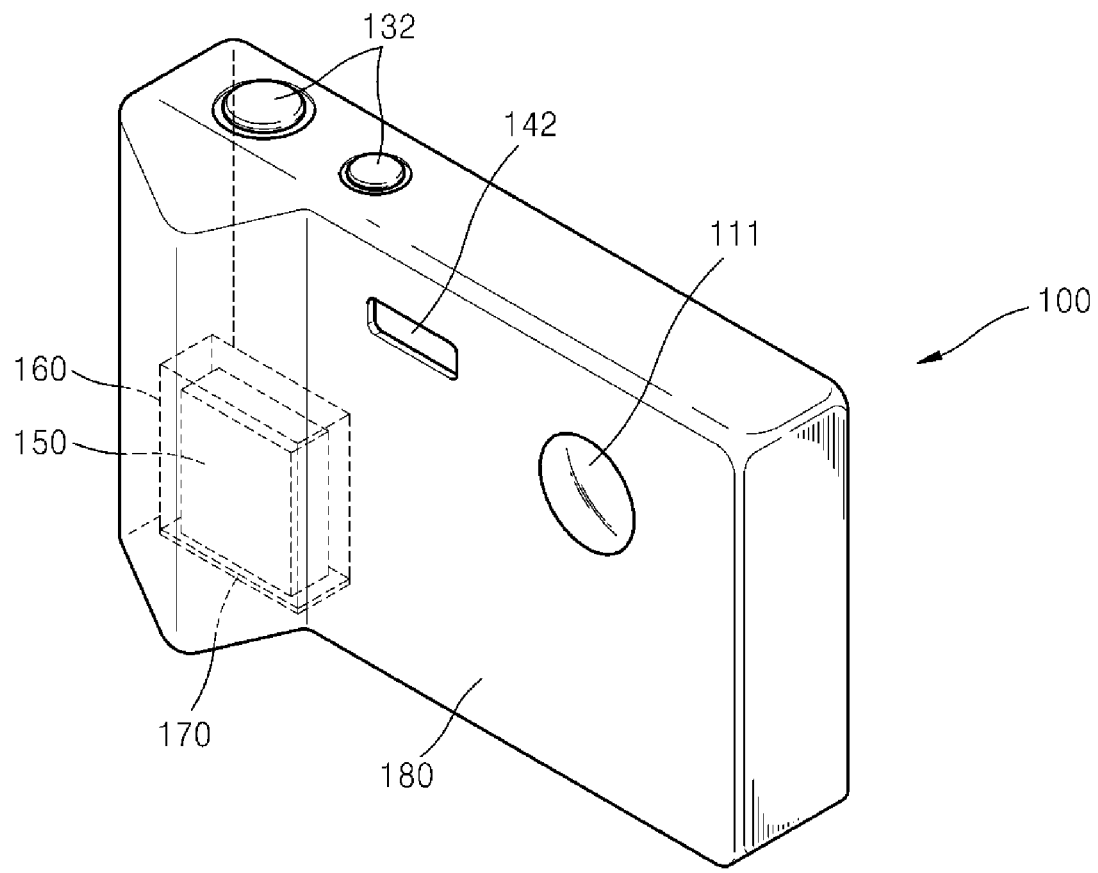
FIG. 1 is a perspective view of an example of a photographing apparatus.
Figure 2:
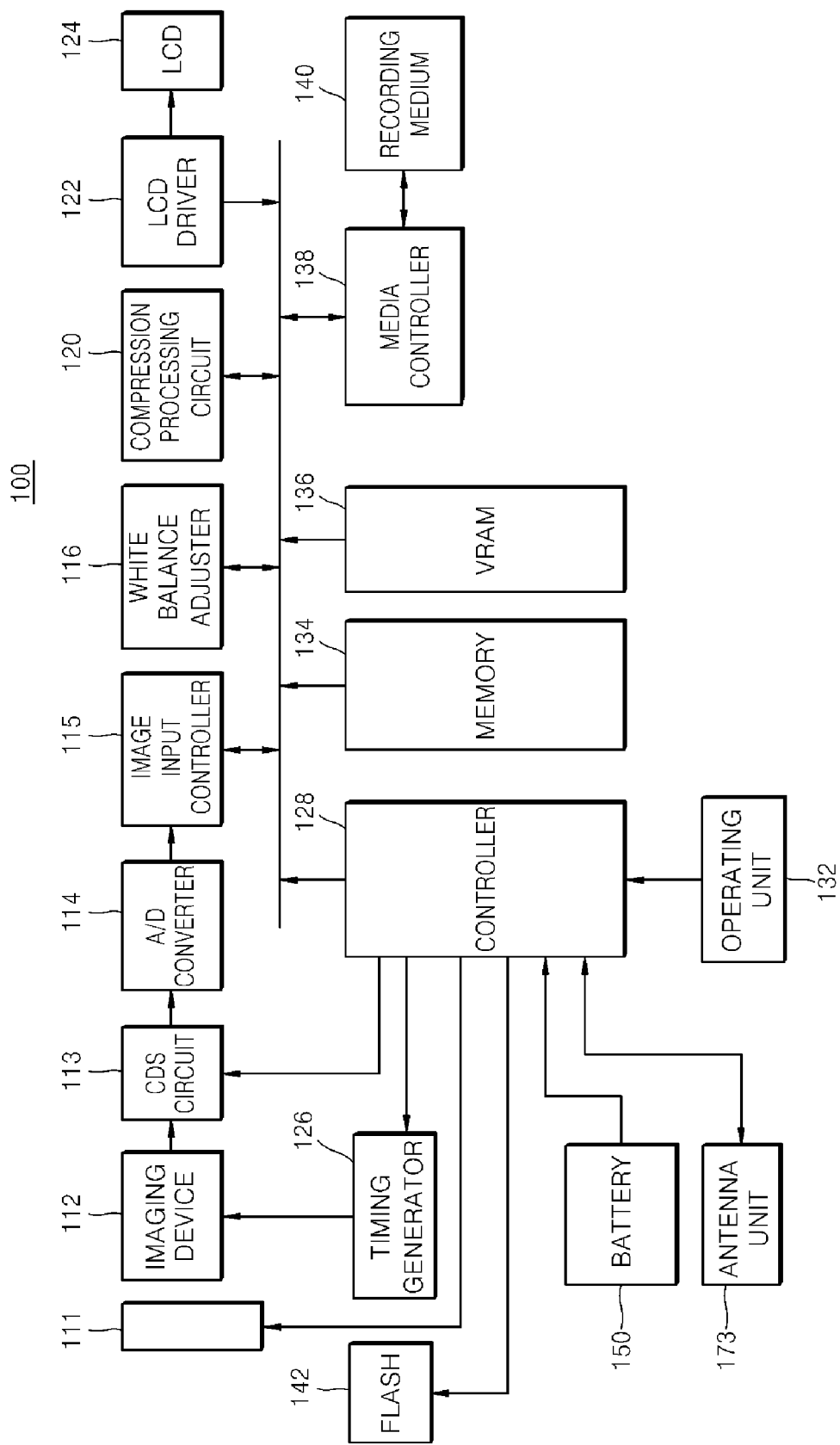
FIG. 2 is a block diagram of the photographing apparatus of FIG. 1.
Figure 3:
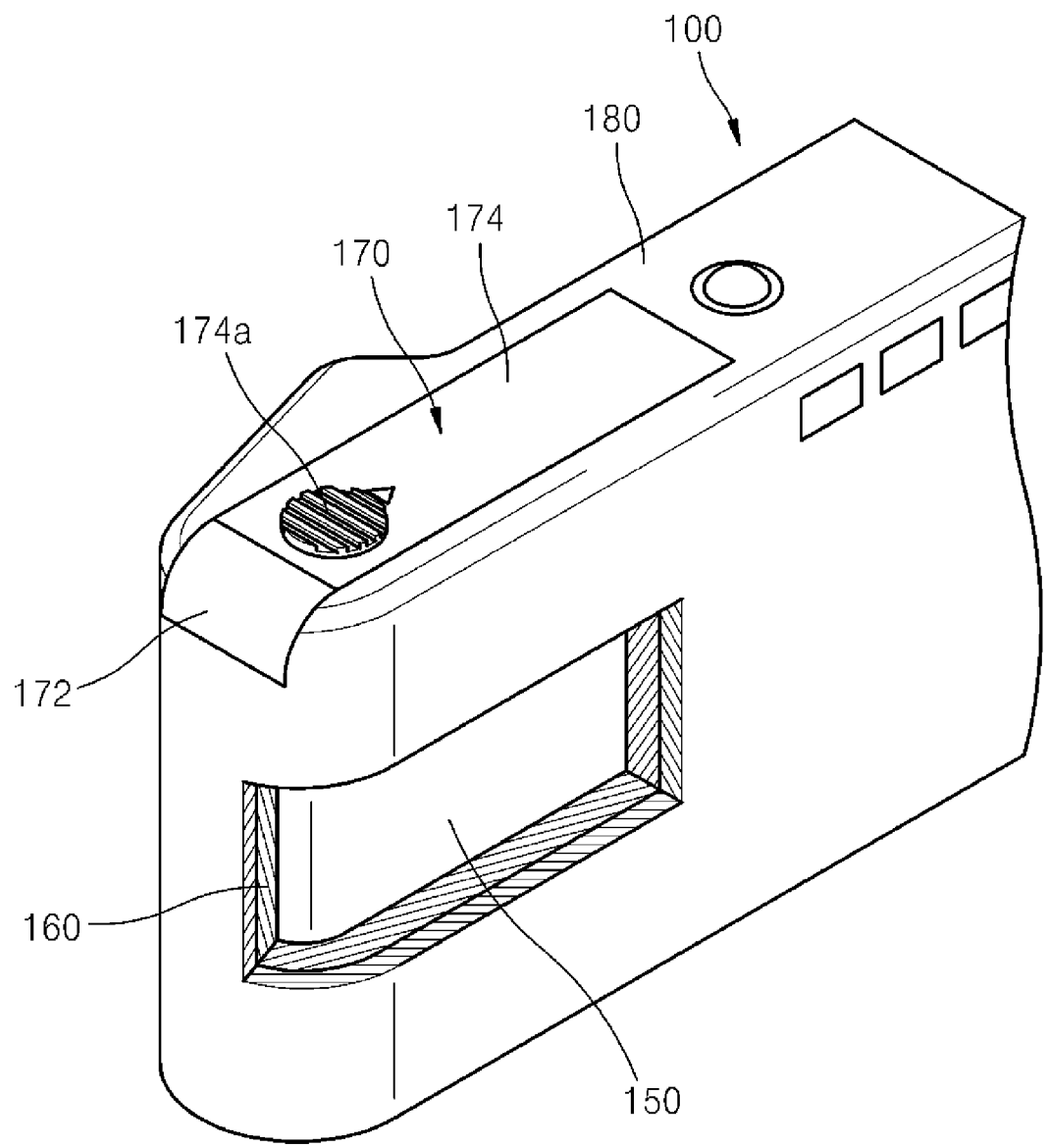
FIG. 3 is a partial exploded perspective view of a bottom of the photographing apparatus of FIG. 1 in a state in which a battery cover is closed.

FIG. 1 is a perspective view of an example of a photographing apparatus 100. FIG. 2 is a block diagram of the photographing apparatus 100 of FIG. 1. FIG. 3 is a partial exploded perspective view of a bottom of the photographing apparatus 100 of FIG. 1 in a state in which a battery cover 170 is closed.

The photographing apparatus 100 is a compact digital camera in which a lens unit 111 and a body unit are integrally formed.

Referring to FIGS. 1 through 3, the photographing apparatus 100 includes an optical system having the lens unit 111, an imaging device 112, a correlated double sampling (CDS) circuit 113 integrally formed with an amplifier, an analog/digital (A/D) converter 114, an image input controller 115, a white balance adjuster 116, a compression processing circuit 120, a liquid crystal display (LCD) driver 122, an LCD 124, a timing generator 126, a controller 128, an operating portion 132, a memory 134, a video random access memory (VRAM) 136, a media controller 138, a recording medium 140, a flash 142, a battery 150, a battery accommodating unit 160, the battery cover 170 and an antenna unit 173, and an external form of the photographing apparatus 100 is maintained, mainly, by a frame 180.

The lens unit 111 transmits image light of a subject so that the image light beam reaches the imaging device 112.

The lens unit 111 includes a zoom lens, a focus lens, an iris, a shutter, and so on. The zoom lens has a focal length that may vary by moving the zoom lens in front and rear directions, i.e., along an optical axis, and changes the size of an image of the subject. In addition, the iris adjusts the amount of light incident on the imaging device 112 during photographing of a subject. The focus lens adjusts a focal point of the photographing apparatus 100 by moving the focus lens in the front and rear directions, i.e., along the optical axis.

The imaging device 112 is disposed at a position where the image light transmitted through the lens unit 111 is captured, and thus the imaging device 112 converts captured image light into an electronic signal.

The imaging device 112 may include a charge coupled device (CCD). In embodiments, the imaging device 112 may include a complementary metal oxide semiconductor (CMOS), or another image sensor.

The CDS circuit 113 is a circuit including a CDS circuit integrated with an amplifier. The CDS circuit is a kind of sampling circuit that may remove noise from an electronic signal output from the imaging device 112, and the amplifier may amplify the electronic signal in which noise is removed. In the present embodiment, a circuit including a CDS circuit and an amplifier constitutes the CDS circuit 113. In other embodiments, the CDS circuit and the amplifier may be configured in separate circuits.

The A/D converter 114 converts an analog electronic signal generated by the imaging device 112 into a digital signal.

The image input controller 115 transfers a digital imaging signal to the controller 128. The white balance adjuster 116 is a circuit adjusting a white balance value by using captured image data output from the imaging device 112.

The compression processing circuit 120 performs compression-processing in which the captured image data is compressed into an appropriate format, reversibly or irreversibly. Examples of the appropriate format may include a joint photographic experts group (JPEG) type or a JPEG 2000 type.

The LCD 124 functions as a display unit, and may display a live view prior to photographing, various images for setting settings on the photographing apparatus 100, a captured image, or so on. The captured image data or various pieces of information of the photographing apparatus 100 may be displayed on the LCD 124 via the LCD driver 122.

In FIG. 1, the LCD 124 is used as a displaying unit. In other embodiments, an organic light-emitting diode, a field emission display (FED), and so on may be used as a displaying unit.

The timing generator 126 inputs a timing signal to the imaging device 112. A shutter speed is determined according to the timing signal input by the timing generator 126. That is, driving of the imaging device 112 is controlled by the timing signal output from the timing generator 126, and the image light of the subject is incident on the imaging device 112 during the driving of the imaging device 112. Thus, an electrical signal that is the basis of the image data is generated.

The controller 128 performs command from a signal system such as the imaging device 112 and the CDS circuit 113, and performs a manipulation command from a manipulation unit such as the operating portion 132. Alternatively, the photographing apparatus 100 may include a plurality of controllers.

In addition, the controller 128 performs an image processing function. That is, the controller 128 processes the captured image data output from the imaging device 112. For example, the controller 128 performs gamma correction on the captured image data output from the imaging device 112.

Gamma correction refers to encoding information to agree with nonlinearity of human sight. That is, since human sight responds to brightness nonlinearly, according to Weber's law, when brightness is linearly recorded in captured image data with limited bit depth, posterization may occur. Thus, in order to obtain the maximum image quality with limited bit depth, the captured image data is encoded using a nonlinear function, which is referred to as gamma correction.

The controller 128 may perform gamma correction by using a gamma curve with respect to an image signal input to the controller 128, and may then output the image signal. For example, the controller 128 may calibrate an image signal having 12 bits of input brightness levels and then outputs an image signal having 8 bits of brightness level.

In addition, the controller 128 is electrically connected to the antenna unit 173 to perform wireless transmission or receipt when the battery cover 170 is closed. To achieve this, a circuit performing a wireless transmission or receipt function and processing data that is transmitted and received is installed in the controller 128.

The operating portion 132 also operates as a photographing mode selecting unit. In addition, members for manipulating the photographing apparatus 100 or for setting various settings during photographing are disposed in the operating portion 132. The members disposed in the operating portion 132 includes a power button, a cross key and a selection button, and may be used to select a photographing mode and a photographing drive mode and to set an effect parameter, and a shutter button for initiating manipulation of photographing.

The memory 134 is an example of an image storage unit, and temporarily stores captured image data or data required to operate the photographing apparatus 100. The memory 134 may have the capacity to store a plurality of images. An image may be written to or read from the memory 134 under the control of the image input controller 115.

The VRAM 136 maintains contents displayed on the LCD 124. The resolution and the maximum number of colors of the LCD 124 vary with the capacity of the VRAM 136.

The recording medium 140 is an example of an image recording unit, and records the captured image. The captured image is input to or output from the recording medium 140 under the control of the media controller 138. The recording medium 140 may be a secure digital (SD) card or a multimedia card (MMC) for storing data.

The flash 142 may flash light when a photographing operation is performed in a dark environment. Flash modes using the flash 142 may include an automatic flash mode, a compulsive light emitting mode, light emitting inhibiting mode, a red eye reduction mode, slow synchro mode, and so on.

The photographing apparatus 100 may include the battery 150.

The battery 150 supplies power to the photographing apparatus 100.

A disposable battery or a rechargeable battery may be used as the battery 150. A manganese battery or an alkaline battery may be used as the disposable battery. A nickel-cadmium (Ni—Cd) battery, a nickel-hydrogen (Ni-MH) battery, or a lithium (Li) ion battery may be used as the rechargeable battery.

The battery 150 is accommodated in the battery accommodating unit 160 installed in the photographing apparatus 100.

The battery accommodating unit 160 is installed in the frame 180 of the photographing apparatus 100. An inlet of the battery accommodating unit 160 may be formed on a bottom surface of the photographing apparatus 100.

The inlet of the battery accommodating unit 160 may be formed on the bottom surface of the photographing apparatus 100. In embodiments, the location of the inlet of the battery accommodating unit 160 is not particularly limited. For example, the inlet of the battery accommodating unit 160 may be formed on a lateral or upper surface of the photographing apparatus 100.

The battery cover 170 is disposed on the inlet of the battery accommodating unit 160, and is hinged to the frame 180. Thus, the battery cover 170 may be rotated around a hinge structure so as to be opened or closed. This will be described together with the description of a 'battery cover structure', in more detail.

Hereinafter, the battery cover structure will be described in more detailed, with reference to FIGS. 4 through 8. The battery cover structure refers to elements required to install the battery cover 170 in the frame 180, and refers to an assembly including the battery accommodating unit 160, the battery cover 170, the frame 180, and so on.

Figure 4:
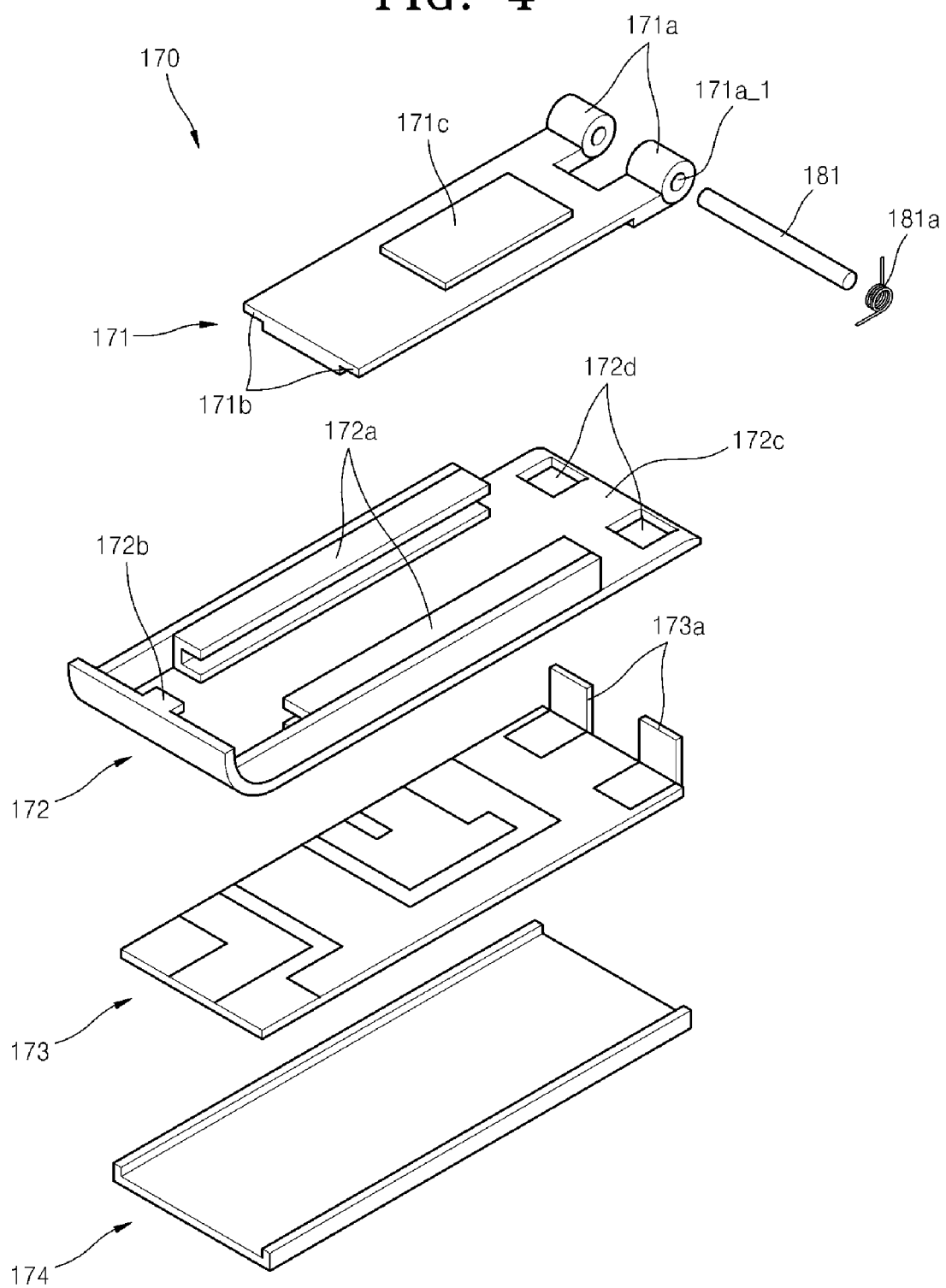
FIG. 4 is an exploded perspective view of an example of a battery cover of FIG. 1.
Figure 5:
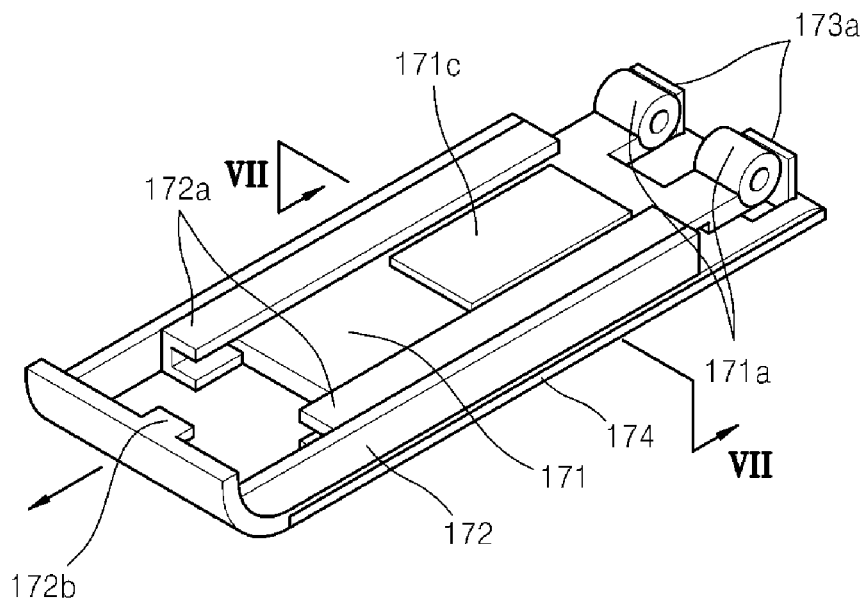
FIGS. 5 and 6 are perspective views illustrating how a first cover unit slides onto an installing unit.
Figure 6:
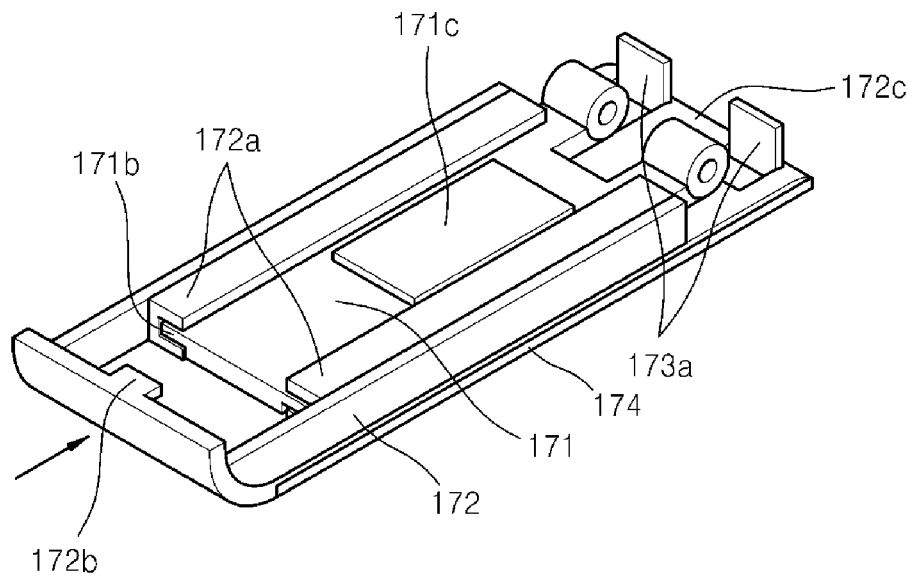
Figure 7:
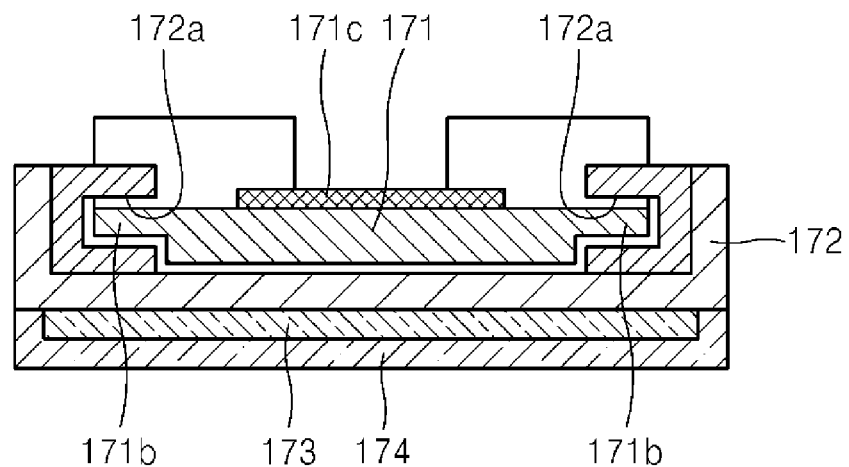
FIG. 7 is a cross-sectional view taken along a line VII-VII of FIG. 5.
Figure 8:
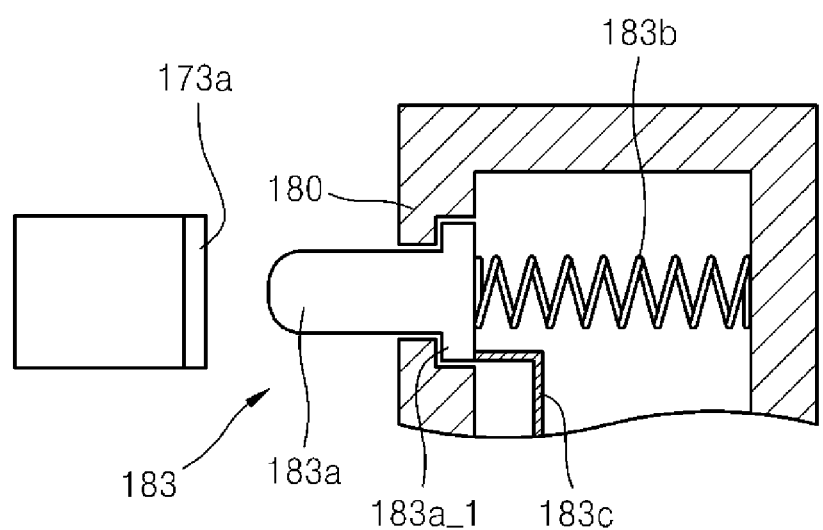
FIG. 8 is a schematic view of an example of an antenna connection unit.

FIG. 4 is an exploded perspective view of an example of a battery cover of FIG. 1. FIGS. 5 and 6 are perspective views illustrating how a first cover unit 172 slides onto an installing unit 171. FIG. 7 is a cross-sectional view taken along a line VII-VII of FIG. 5. FIG. 8 is a schematic view of an example of an antenna connection unit 183.

Referring to FIG. 4, the battery cover 170 includes the installing unit 171, the first cover unit 172, the antenna unit 173, and a second cover unit 174.

The installing unit 171 is used to allow for rotation of the battery cover 170, and is installed so as to rotate around the frame 180. To achieve this, the installing unit 171 is hinged to the frame 180.

That is, hinge hole members 171*a* are formed on the installing unit 171. A hinge hole 171*a*_1 is formed in each of the hinge hole members 171*a*. When assembling the photographing apparatus 100, the installing unit 171 is hinged to the frame 180 by inserting a hinge pin 181 installed in the frame 180 into the hinge hole 171*a*_1.

A torsion coil spring 181*a* is fitted to the hinge pin 181, and facilitates an opening operation of the battery cover 170.

Guide portions 171*b* for a sliding operation of the first cover unit 172 are formed at both sides of the installing unit 171.

A battery contact portion 171*c* to be in contact with the battery 150 is installed on a top surface of the installing unit 171.

The battery contact portion 171*c* is installed on the top surface of the installing unit 171. In embodiments, the battery contact portion 171*c* may be not installed on the installing unit 171.

The first cover unit 172 is installed so as to slide onto the installing unit 171. To achieve this, guide accommodating portions 172*a* that accommodate the guide portions 171*b* are formed in the first cover unit 172.

Referring to FIG. 7, the guide accommodating portions 172*a* accommodates the guide portions 171*b* so as to prevent the first cover unit 172 from being separated from the installing unit 171 while also guiding the installing unit 171 during sliding of the installing unit 171.

A fixing protrusion 172*b* is formed on an end of the first cover unit 172, and maintains a closing state of the battery cover 170.

That is, the fixing protrusion 172*b* is inserted into a fixing groove 182 formed around the battery accommodating unit 160 when the battery cover 170 is closed, and thus the battery cover 170 is prevented from being automatically opened without user's operation.

Holes 172*d* are formed around another end 172*c* of the first cover unit 172. Terminal contact portions 173*a* of the antenna unit 173 are installed through the holes 172*d*.

The antenna unit 173 functions as an antenna. An electric circuit functioning as an antenna is arranged on the antenna unit 173. The antenna unit 173 is formed having a rigid or flexible substrate shape.

The terminal contact portions 173*a* are formed on one end of the antenna unit 173. When the battery cover 170 is closed, the terminal contact portions 173*a* move towards the antenna connection unit 183, come in contact with the antenna connection unit 183, and thus transmit and receive electrical signals to and from the antenna connection unit 183.

In the embodiment illustrated, the number of the terminal contact portions 173*a* formed on the antenna unit 173 is two. However, the number of terminal contact portions formed on the antenna unit 173 may be is not particularly limited.

The second cover unit 174 is formed so to cover the antenna unit 173. That is, the antenna unit 173 is disposed between the second cover unit 174 and the first cover unit 172. Due to this structure, the antenna unit 173 may be prevented from external impacts.

As illustrated in FIG. 3, an operating portion 174*a* is formed on a surface of the second cover unit 174 that does not face the antenna unit 173, that is, the surface that faces outwards, from among surfaces of the second cover unit 174. By exerting a force on the operating portion 174*a*, an assembly including the first cover unit 172, the antenna unit 173 and the second cover unit 174 may slide.

According to the present embodiment, the second cover unit 174 is formed separately so as to cover the antenna unit 173. In other embodiments, the second cover unit 174 may not be used in the battery cover 170. In this case, in order to protect the antenna unit 173, the antenna unit 173 may be installed on a surface of the first cover unit 172 that faces the installing unit 171 from among surfaces of the first cover unit 172, and the antenna unit 173 may be disposed so as not to interrupt a sliding operation of the first cover unit 172.

The frame 180 refers to all frames for supporting the external form of the photographing apparatus 100. That is, the frame 180 may be a support frame disposed in the photographing apparatus 100. In addition, when an external case is used to support the external form of the photographing apparatus 100, the external case may be the frame 180.

The hinge pin 181, the fixing groove 182, and the antenna connection unit 183 are disposed around the battery cover structure from among portions of the frame 180.

Since the structures and locations of the hinge pin 181 and the fixing groove 182 have been described, their description will not be repeated.

When the battery cover 170 is closed, the antenna connection unit 183 comes in contact with the terminal contact portions 173*a*. The antenna connection unit 183 is electrically connected to the controller 128 disposed in the photographing apparatus 100. That is, the antenna connection unit 183 may receive an electrical wireless signal from the antenna unit 173, and then may transmit the received electrical wireless signal to the controller 128, or may receive an electrical signal from the controller 128, and then may transmit the electrical signal to the antenna unit 173.

The antenna connection unit 183 is installed in the frame 180 so as to be able to elastically contact with the terminal contact portions 173*a* when the battery cover 170 is closed. This structure buffers impacts generated when the antenna connection unit 183 comes in contact with the terminal contact portions 173*a*, and maintains electrical connection between the antenna connection unit 183 and the terminal contact portions 173*a* even though the antenna connection unit 183 and the terminal contact portions 173*a* are slightly spaced apart from each other when the battery cover 170 is closed. That is, as illustrated in FIG. 8, the antenna connection unit 183 includes a pin portion 183*a*, an elastic member 183*b*, and a connection portion 183*c*.

The pin portion 183*a* is connected directly to the terminal contact portions 173*a*, and has a cylindrical shape. A stumbling portion 183*a*_1 is formed at the rear of the pin portion 183*a* so that the pin portion 183*a* is maintained in the frame 180 and is not separated from the frame 180.

The elastic member 183*b* includes a cylindrical coil spring, and is installed so as to elastically protrude the pin portion 183*a* towards the battery cover 170. That is, the pin portion 183*a* of the antenna connection unit 183 is installed in the frame 180 so as to be elastically biased due to the elastic member 183*b* against a direction in which the terminal contact portions 173*a* come in contact with the pin portion 183*a*.

The connection portion 183*c* electrically connects the pin portion 183*a* to the controller 128.

The antenna connection unit 183 having the above-described structure may be elastically biased to contact the terminal contact portions 173*a*. Although the antenna connection unit 183 has the above-described structure, the antenna connection unit 183 may have a pogo-pin structure that is largely used in electronic products.

Hereinafter, with reference to FIGS. 5 and 6, a sliding operation of the battery cover 170 will be described. FIGS. 5 and 6 are cross-sectional views for explaining relative movement between the installing unit 171 and the first cover unit 172, according to an embodiment.

FIG. 5 illustrates the case where the first cover unit 172 slides in a left direction. The guide accommodating portions 172*a* of the first cover unit 172 accommodating the guide portions 171*b* of the installing unit 171 slides in the left direction. The first cover unit 172 slides in the left direction, and then the movement of the first cover unit 172 is blocked since the terminal contact portions 173*a* of the antenna unit 173 are stumbled by the hinge hole members 171*a*.

FIG. 6 illustrates the case where the first cover unit 172 slides in a right direction. The guide accommodating portions 172*a* of the first cover unit 172 accommodating the guide portions 171*b* of the installing unit 171 slides in the right direction. At this time, the first cover unit 172 slides in the right direction, and then the movement of the first cover unit 172 is blocked since the other end 172*c* of the first cover unit 172 is stopped by the frame 180.

Hereinafter, with reference to FIGS. 9 through 12, an operation of the battery cover structure when the battery cover 170 of the photographing apparatus 100 is changed from an open state to a close state will be described.

Figure 9:
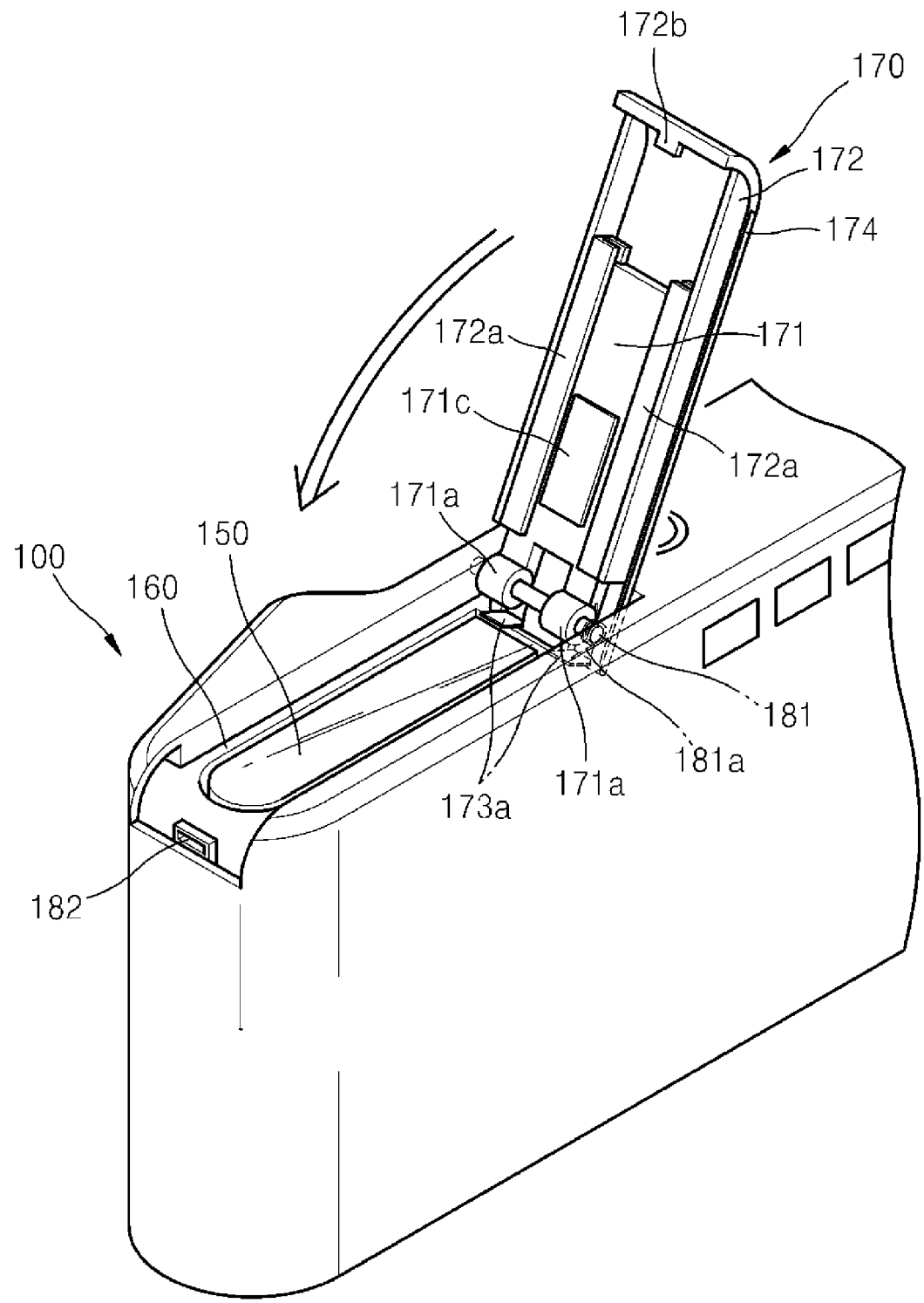
FIG. 9 is a perspective view of a battery cover structure when the battery of the photographing apparatus of FIG. 4 is opened.
Figure 10:
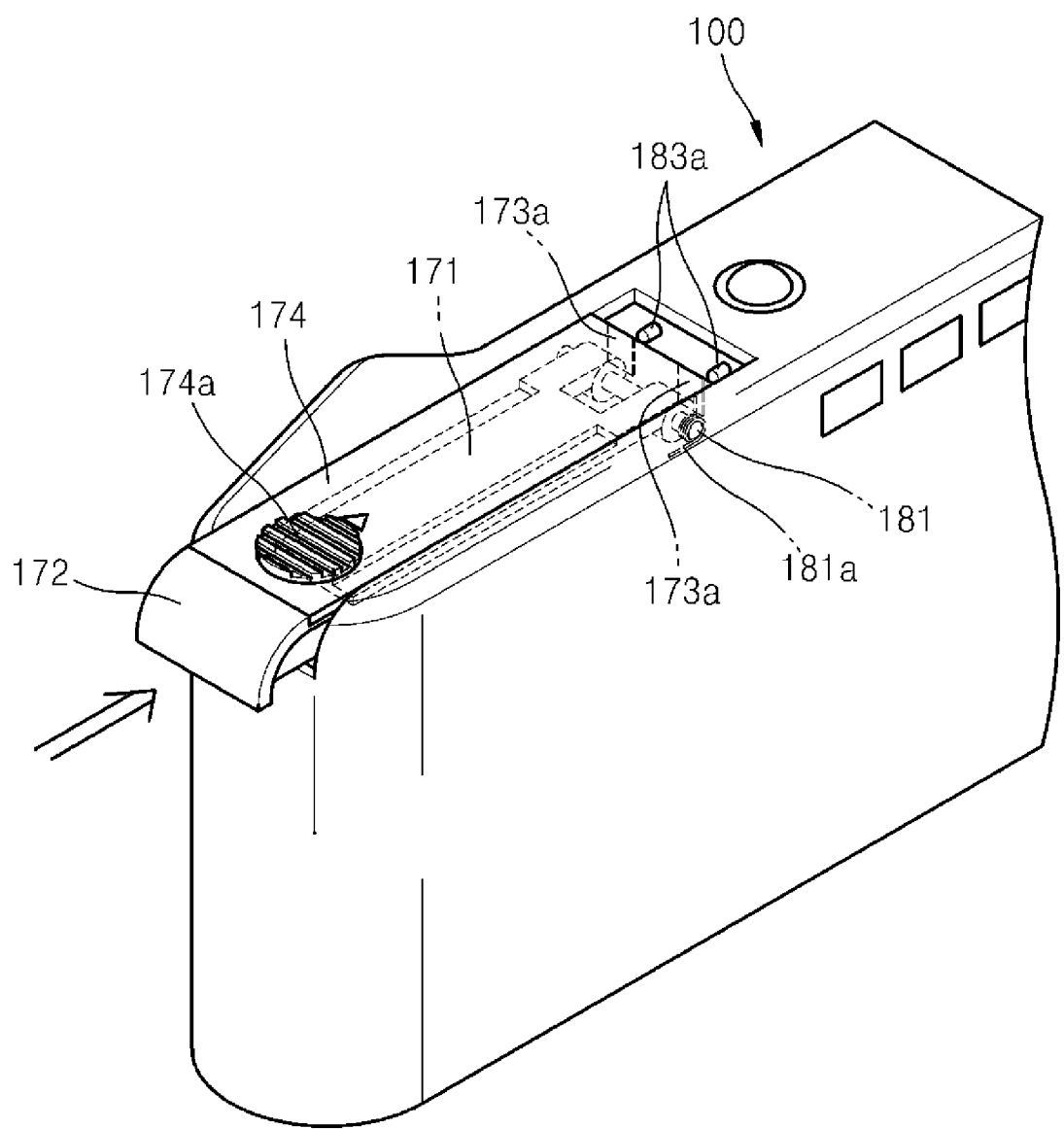
FIG. 10 is a perspective view of the case in which the battery cover of FIG. 9 is not completely closed although the battery cover is rotated downwards.
Figure 11:
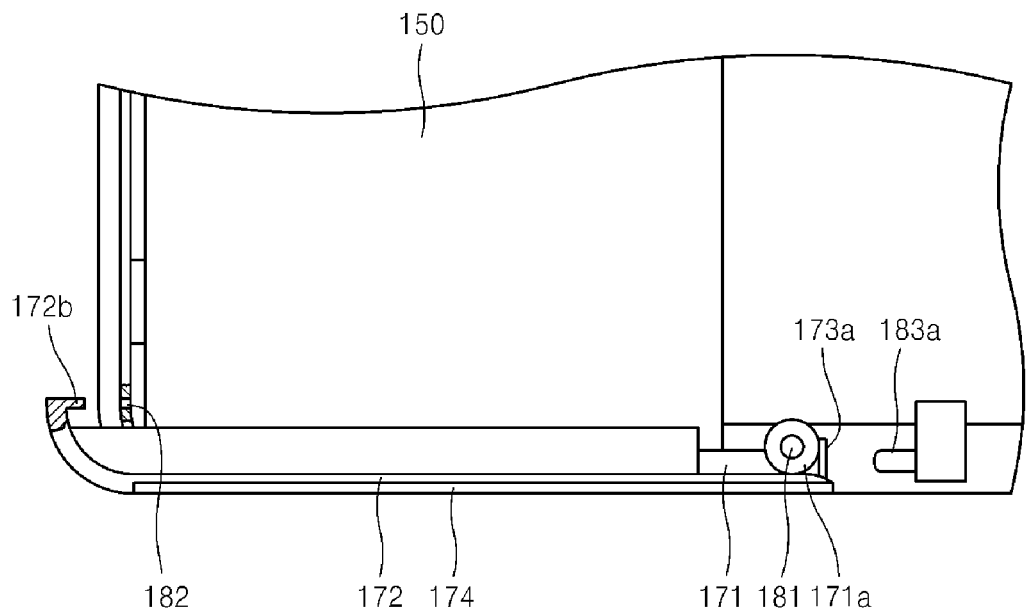
FIG. 11 is a partial cross-sectional view of the case where the battery cover of FIG. 10 is in the state of FIG. 10.
Figure 12:
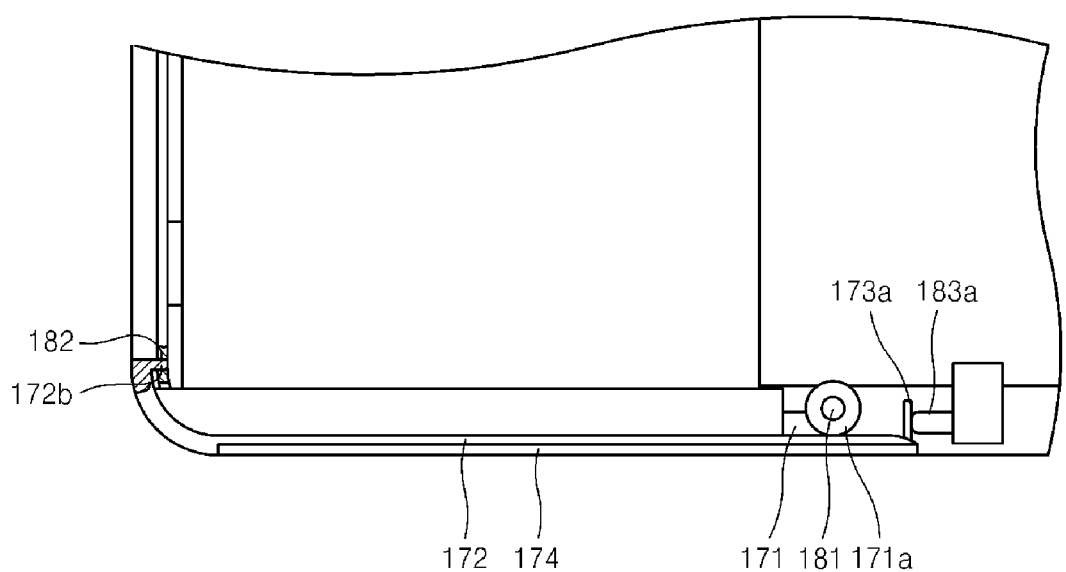
FIG. 12 is a partial cross-sectional view of the case where the battery cover of FIG. 11 is completely closed.

FIG. 9 is a perspective view of the battery cover structure when the battery cover 170 of the photographing apparatus 100 is opened. FIG. 10 is a perspective view of the case when the battery cover 170 is not completely closed although the battery cover 170 is rotated downwards. FIG. 11 is a partial cross-sectional view of the case where the battery cover structure is in the state of FIG. 10, according to an embodiment. FIG. 12 is a partial cross-sectional view of the case where the battery cover 170 is completely closed, according to an embodiment. A state of the battery cover structure of FIG. 12 is the same as that of FIG. 3.

When the battery cover structure is in a state of FIG. 9, a user may change the battery 150. Thus, the battery 150 may be taken out of the battery accommodating unit 160 by separating the battery 150 from the battery accommodating unit 160. Inversely, the battery 150 may be accommodated in the battery accommodating unit 160.

When the terminal contact portions 173*a* of the antenna unit 173 are in the state of FIG. 9, since the terminal contact portions 173*a* are separated from the pin portion 183*a* of the antenna connection unit 183, the antenna unit 173 is electrically separated from the controller 128, and thus the antenna unit 173 does not operate.

When a user rotates the battery cover 170 in the state of FIG. 9 in an arrow direction, the battery cover structure may be in the same state as a state of FIGS. 10 and 11.

That is, when the user rotates the battery cover 170 in the arrow direction of FIG. 9, the battery cover 170 rotates to be in the state of FIGS. 10 and 11. Elastic potential energy is accumulated in the torsion coil spring 181a due to such a rotation. The elastic potential energy is changed to kinetic energy when the battery cover 170 is opened so as to facilitate an opening operation of the battery cover 170.

Also, the terminal contact portions 173a of the antenna unit 173 are separated from the pin portion 183a of the antenna connection unit 183, which is illustrated in FIG. 11 in more detail.

When a user exerts a force on the operating portion 174a of the second cover unit 174 of the battery cover 170 or an end of the first cover unit 172, which is in a state of FIGS. 10 and 11, in an arrow direction of FIG. 10, an assembly including the first cover unit 172, the antenna unit 173 and the second cover unit 174 moves in a right direction, the battery cover 170 is completely closed, and then the battery cover structure may be in the same state a state of FIGS. 3 and 12.

When the battery cover 170 is completely closed, the terminal contact portions 173a of the antenna unit 173 come in contact with the pin portion 183a of the antenna connection unit 183, as illustrated in FIG. 12, and thus the antenna unit 173 is electrically connected to the controller 128. In addition, the fixing protrusion 172b is fixed to the fixing groove 182, and thus a close state of the battery cover 170 is stably maintained.

The case where the battery cover 170 of the photographing apparatus 100 is changed from an open state to a closed state has been described. Inversely, in order to change the battery cover 170 of the photographing apparatus 100, the above-described process may be inversely performed, and descriptions thereof will be omitted.

As described above, using the battery cover structure according to the presented embodiments, the battery cover 170 accommodating the antenna unit 173 therein may be embodied in a simple structure. In addition, since the antenna unit 173 is electrically connected to the controller 128 by the terminal contact portions 173a and the antenna connection unit 183, a separate cable is not required, and thus an internal space of the photographing apparatus 100 may be efficiently used, and the manufacturing costs may be reduced.

Due to a simple structure of the battery cover structure of the photographing apparatus 100 according to the presented embodiments, internal space of the photographing apparatus 100 may be efficiently used, and the manufacturing costs of the photographing apparatus 100 may be reduced.

The photographing apparatus 100 is a compact camera. In embodiments, the kind and form of the photographing apparatus 100 may be different. For example, the photographing apparatus 100 may be a single-lens reflex camera, a video camcorder, or a cellular phone integrated with a camera.

By implementing the battery cover structure according to the presented embodiments, the antenna unit 173 may be easily installed in the battery cover 170.

While the invention has been particularly shown and described with reference to exemplary embodiments thereof, it will be understood by one of ordinary skill in the art that various changes in form and details may be made therein without departing from the spirit and scope of the invention as defined by the following claims.

What is claimed is:

1. A battery cover structure comprising:
a frame in which an antenna connection unit is disposed;
a battery cover installed on the frame,
wherein the battery cover comprises:
an installing unit installed on the frame;
a first cover unit installed on the installing unit; and
an antenna unit installed on the first cover unit, wherein electrical contact between the antenna unit and the antenna connection unit is maintained or released according to a location of the first cover unit; and
the antenna connection unit is installed in the frame so as to be elastically biased against a direction in which the antenna connection unit contacts the antenna unit.

2. The battery cover structure of claim 1, further comprising a battery accommodating unit installed in the frame, wherein a battery is accommodated in the battery accommodating unit, and
wherein the battery cover is disposed on an inlet of the battery accommodating unit.

3. The battery cover structure of claim 1, wherein the installing unit is installed so as to rotate around the frame.

4. The battery cover structure of claim 3, wherein the installing unit is installed to the frame so as to constitute a hinge structure.

5. The battery cover structure of claim 4, further comprising a hinge hole formed in the installing unit, wherein a hinge pin installed in the frame is inserted into the hinge hole.

6. The battery cover structure of claim 5, further comprising a torsion coil spring fitted to the hinge pin.

7. The battery cover structure of claim 1, wherein the first cover unit is installed so as to slide on the installing unit.

8. The battery cover structure of claim 7, further comprising: a guide portion formed on the installing unit; and
a guide accommodating portion in which the guide portion is accommodated, wherein the guide accommodating portion is formed on the first cover unit.

9. The battery cover structure of claim 1, further comprising:
a fixing protrusion formed on an end of the first cover unit, and
a fixing groove corresponding to the fixing protrusion, wherein the fixing groove is formed in the frame.

10. The battery cover structure of claim 1, wherein the antenna unit comprises at least one terminal contact portion performing electrical connection with the antenna connection unit.

11. The battery cover structure of claim 10, wherein the at least one terminal contact portion moves towards the antenna connection unit so as to come in contact with the antenna connection unit when the battery cover is closed.

12. The battery cover structure of claim 1, further comprising a second cover unit covering the antenna unit.

13. A photographing apparatus configured to photograph a subject, the photographing apparatus comprising:
an antenna connection unit disposed in the photographing apparatus;
a frame in which the antenna connection unit is disposed;
a battery cover installed on the frame,
wherein the battery cover comprises:
an installing unit installed on the frame;
a first cover unit installed on the installing unit; and
an antenna unit installed on the first cover unit, wherein electrical contact between the antenna unit and the antenna connection unit is maintained or released according to a location of the first cover unit; and the antenna connection unit is installed in the frame so as to be elastically biased against a direction in which the antenna connection unit contacts the antenna unit.

14. The photographing apparatus of claim 13, further comprising a battery accommodating unit installed in the frame, wherein a battery is accommodated in the battery accommodating unit, and wherein the battery cover is disposed on an inlet of the battery accommodating unit.

15. The photographing apparatus of claim 13, wherein the installing unit is installed so as to rotate around the frame.

16. The photographing apparatus of claim 13, wherein the first cover unit is installed so as to slide on the installing unit.

17. The photographing apparatus of claim 16, further comprising: a guide portion formed on the installing unit; and a guide accommodating portion in which the guide portion is accommodated, wherein the guide accommodating portion is formed on the first cover unit.

18. The photographing apparatus of claim 13, wherein the antenna unit comprises at least one terminal contact portion performing electrical connection with respect to the antenna connection unit.

19. The photographing apparatus of claim 18, wherein the at least one terminal contact portion moves towards the antenna connection unit so as to come in contact with the antenna connection unit when the battery cover is closed.

20. The photographing apparatus of claim 13, further comprising a second cover unit covering the antenna unit.

* * * * *